United States Patent

[11] 3,600,018

[72] Inventors Theodore Dzus;
 Peter Schenk, both of West Islip, N.Y.
[21] Appl. No. 858,744
[22] Filed Sept. 17, 1969
[45] Patented Aug. 17, 1971
[73] Assignee Dzus Fastener Co., Inc.
 West Islip, N.Y.

[54] AUTOMOBILE HOOD LATCH
 6 Claims, 3 Drawing Figs.
[52] U.S. Cl. .................................................... 292/59,
 292/62, 292/DIG. 14, 24/221
[51] Int. Cl. ...................................................... E05c 3/04
[50] Field of Search ........................................... 292/228,
 62, 304, 60, 61, 56, 59, 120, 68, 219, 218; 24/221
 A, 221.2

[56] References Cited
 UNITED STATES PATENTS
 3,415,086 12/1968 Trainor .......................... 70/240
 2,470,344 5/1949 Dzus ............................. 24/221

*Primary Examiner*—Richard E. Moore
*Attorney*—Kane, Dalsimer, Kane, Sullivan and Kurucz ABSTRACT: An automobile hood latch is described which includes a stud shank supported beneath the hood and provided with a cam slot. A housing, a resilient pin supported by the housing, and a spring are carried by the automobile hood. The hood is secured by rotatively coupling the pin in the cam slot.

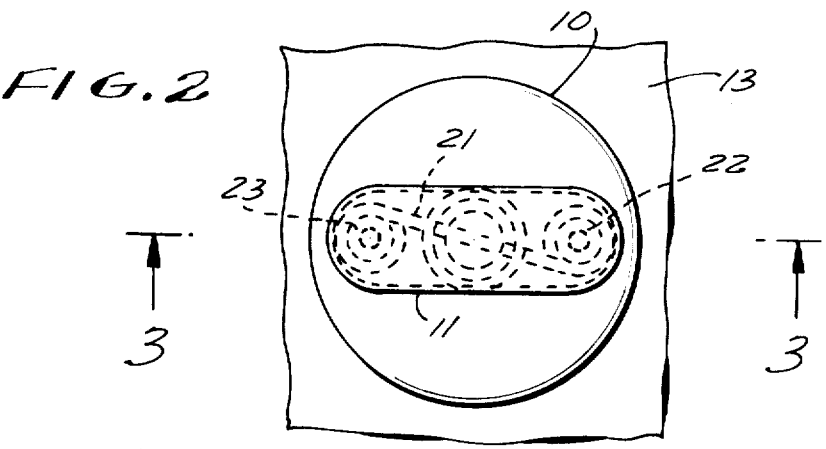
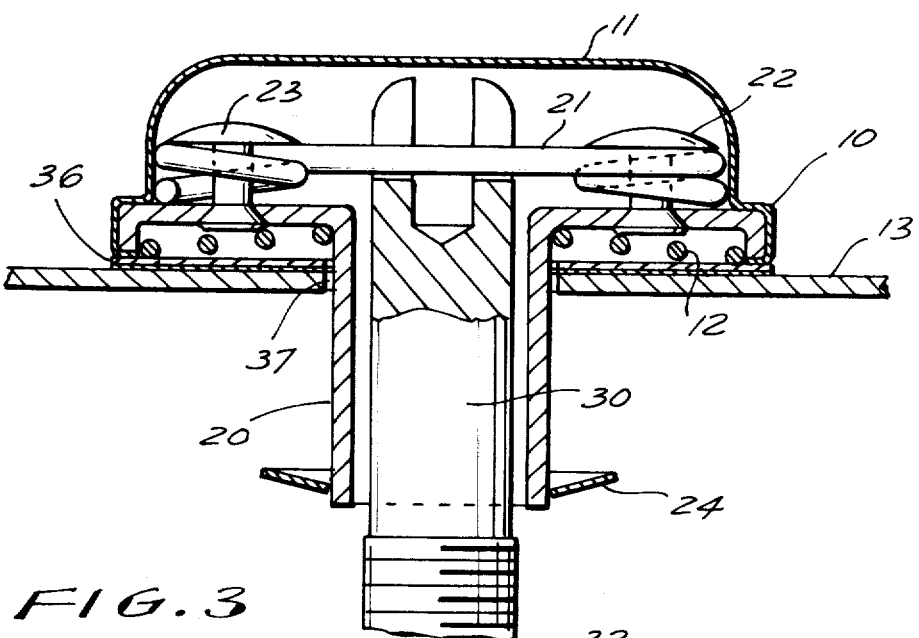

AUTOMOBILE HOOD LATCH

BACKGROUND OF THE INVENTION

This invention relates to a latch assembly and, more particularly, to an automobile hood latch.

Automobile hoods are exposed to vibration from the engine and other sources. It is desirable therefore that the hood lock or latch assembly which maintains the automobile hood in position during travel will not open and will remain securely positioned despite vibration.

BRIEF SUMMARY

An automobile hood latch has now been developed which will not uncouple due to vibration from the automobile system and will maintain the automobile hood in a secure position.

The object of this invention is to provide an automobile hood latch which will not uncouple under the influence of vibration.

Other objects and advantages will become apparent from the following description taken in conjunction with the accompanying drawings in which:

FIG. 2 is a top plan view of the latch assembly;

FIG. 3 is a vertical sectional view taken along the line 3—3 of FIG. 2.

Figure 1:
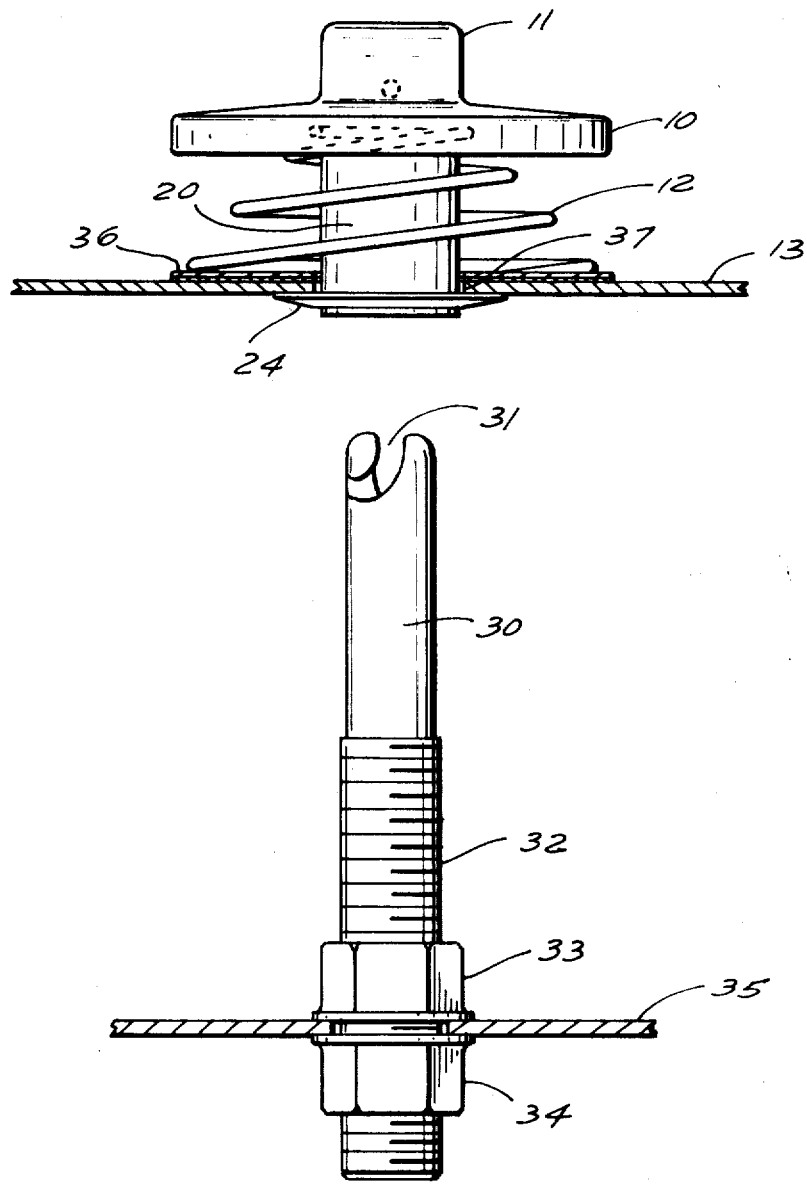
FIG. 1 is an exploded perspective view partly in section of the hood latch assembly.

In accordance with this invention, the automobile hood latch includes a stud shank rigidly supported beneath the automobile hood and provided with a cam slot. A housing is carried by the automobile hood and supports a resilient pin which is rotatable with the housing. A handle extends from the housing for rotation of the housing and pin as a unit. When the rod is inserted into the cam slot and rotated, it will move into a locked position in the cam slot to secure the automobile hood.

PREFERRED EMBODIMENT

Referring now to the drawings, FIG. 1 shows the hood latch in uncoupled relationship. A stud shank 30 is securely mounted to automobile chassis 35 by means of nuts 33 and 34, and threaded section 32. Housing 10, provided with a handle 11, extends downwardly through an opening 37 in automobile hood 13. Pad or washer 36 adheres to hood 13 and presents a smooth surface to spring 12 to facilitate ease of rotation of housing 10 when coupling and uncoupling the latch. FIGS. 2 and 3 show resilient pin 21 mounted to housing 10 by means of fasteners 22 and 23. Pin 21 extends through and is locked in position by cam slot 31 of stud shank 30. Spring 12 is mounted beneath housing 10 to urge the housing upwardly and away from automobile hood 13 when the latch assembly is uncoupled as shown in FIG. 1. The upward force exerted by spring 12 on housing 10 when pin 21 is engaged by cam slot 31 also serves to maintain the pin and slot in locked assembly. To uncouple pin 21 from slot 31, spring 12 is forced downwardly and handle 11 rotated in the reverse direction. Retaining washer member 24 projects outwardly from the base of housing 10 to arrest upward movement of the housing under the action of spring 12 as shown in FIG. 1. In this regard, member 24 is urged against hood 13 to prevent housing 10 from moving out through the opening in the hood.

Although the present invention has been described in conjunction with preferred embodiments, it is to be understood that modifications and variations may be resorted to without departing from the spirit and scope of the invention as those skilled in the art will readily understand.

We claim:

1. An automobile hood latch which comprises:
   a stud shank rigidly supported beneath an automobile hood and provided with a cam slot;
   a housing carried by the automobile hood;
   a resilient pin supported by the housing and rotatable therewith;
   handle means for rotating the housing so that when the pin is inserted into the cam slot and rotated, the pin will move into a locked position in the cam slot to thereby secure the automobile hood; and
   a spring positioned beneath the housing to urge the housing away from the hood and thereby secure the pin in the locked position to prevent the latch from uncoupling.

2. An automobile hood latch in accordance with claim 1, wherein the spring is a coiled spring.

3. An automobile hood latch in accordance with claim 1 wherein the housing is provided with a stop means to arrest movement of the housing as it moves away from the hood under the action of the spring when the pin is uncoupled from the cam slot.

4. An automobile hood latch in accordance with claim 3, wherein said automobile hood is provided with an opening through which housing 10 passes and the stop means includes a retaining washer.

5. An automobile hood latch in accordance with claim 4 wherein the washer extends outwardly from the base of the housing.

6. An automobile hood latch in accordance with claim 1, including a pad interposed between the automobile hood and the spring to facilitate ease of rotation of the housing.